United States Patent [19]

Brihier

[11] 4,062,242
[45] Dec. 13, 1977

[54] MACHINE FOR BALANCING VEHICLE WHEELS

[75] Inventor: Gerard Charles Camille Brihier, Arpajon, France

[73] Assignee: Facom, Morangis, France

[21] Appl. No.: 727,449

[22] Filed: Sept. 28, 1976

[30] Foreign Application Priority Data

Oct. 2, 1975 France .............................. 75.30201

[51] Int. Cl.² ............................................. G01M 1/02
[52] U.S. Cl. ....................................... 73/462; 73/464
[58] Field of Search ................ 73/462, 464; 235/151.3

[56] References Cited

U.S. PATENT DOCUMENTS 3,774,456 11/1973 Crump ................................. 73/462

FOREIGN PATENT DOCUMENTS 24,274 3/1967 Japan ..................................... 73/462

Primary Examiner—James J. Gill
Attorney, Agent, or Firm—Eric P. Schellin

[57] ABSTRACT

In this machine, an optical coding device furnishes a plurality of code numbers one of which is stored upon each rotation of the wheel to be balanced when the latter rotates at a stable measuring speed. This stored number corresponds to the passage of the imbalance through a predetermined position. Thereafter, the motor driving the wheel in rotation is switched off and the number is retained in the store and compared, in the course of a new rotation of the wheel, with the instantaneous number furnished by the coding device. The result of this comparison is displayed by three indicator lamps. When, in the course of the new rotation, the imbalance reaches the position it had at the moment of storage, one of the lamps lights up and the other two lamps are extinguished. The balancing weight must then be fixed to the wheel in a position diametrally opposed to the predetermined position.

15 Claims, 9 Drawing Figures

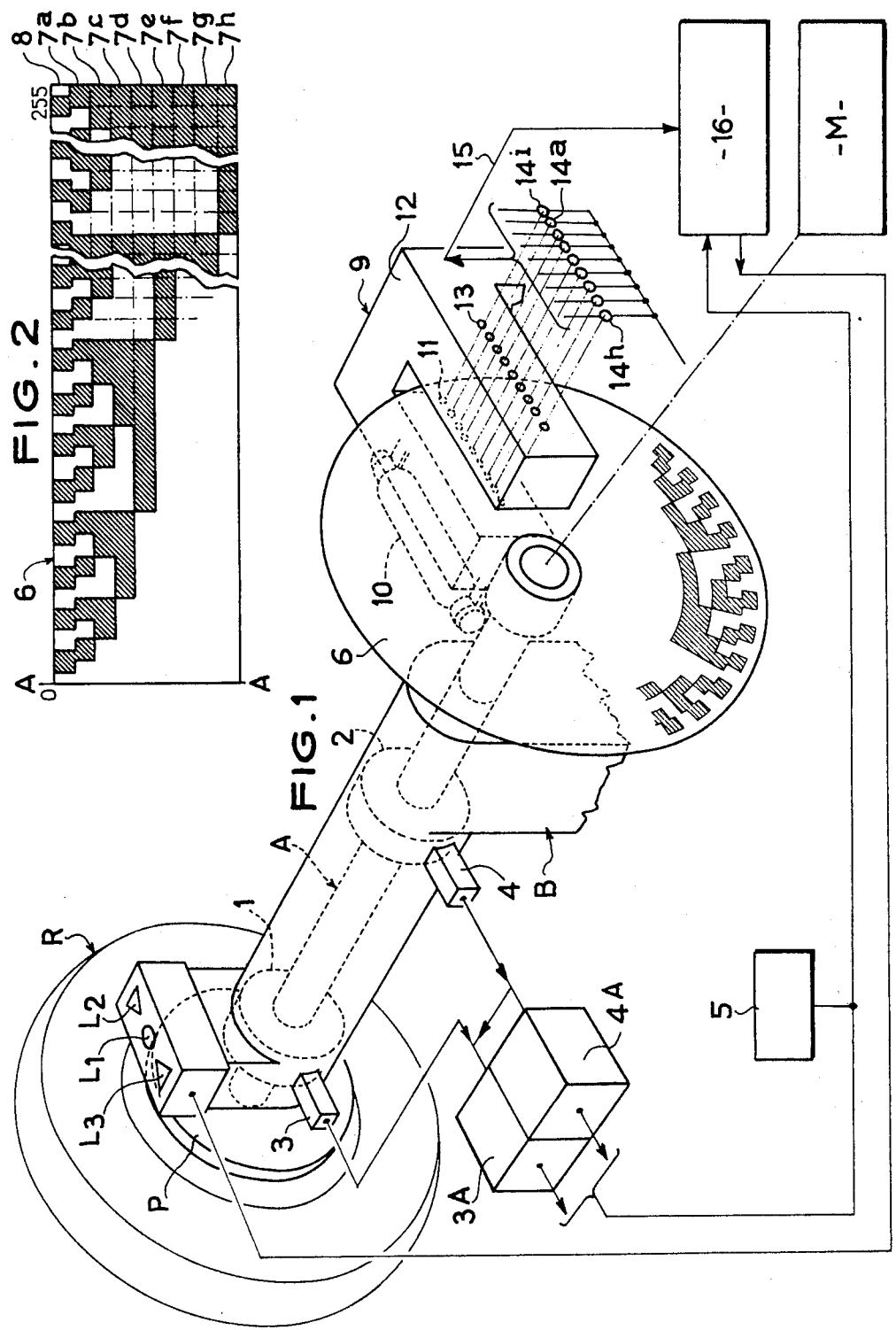

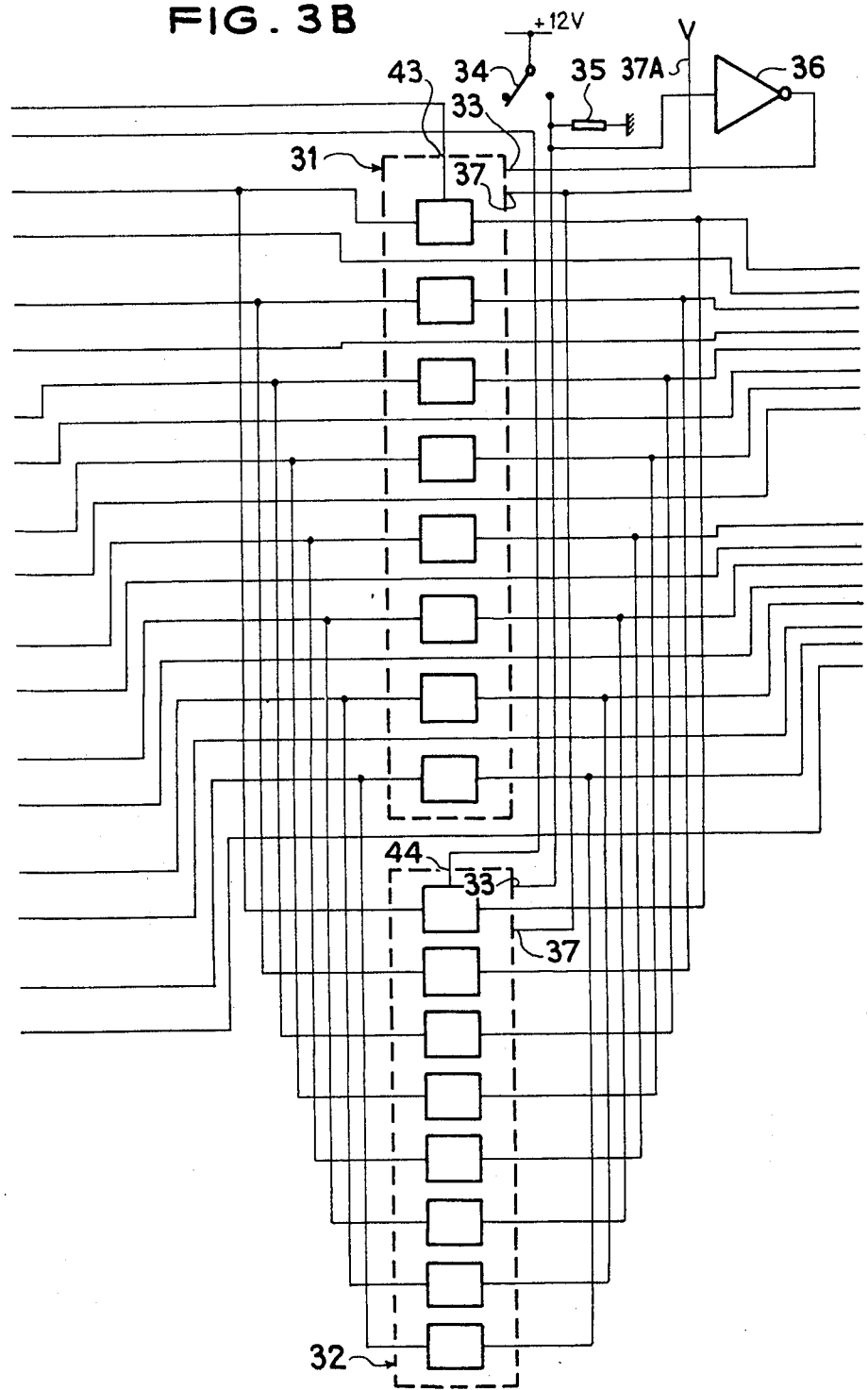

MACHINE FOR BALANCING VEHICLE WHEELS

The present invention relates to a machine for balancing vehicle wheels in which machine it is possible to determine both the valve and the angular position of the imbalance of the wheels by rotation of the latter.

In known machines of this type driving means are usually provided for driving the wheel up to a predetermined stable speed, a detector for detecting the value of the imbalance, for example by a measurement of the pressure exerted by the shaft carrying the wheel on one of its bearings, and means for indicating the location of the imbalance with respect to the centre of the wheel, the balancing weight being then fixed to the rim of the wheel in a position diametrally opposed to the location of the imbalance.

Some known means comprise an opto-electronic measuring system, as for example in French Pat. Nos. 2,245,939 and 2,176,804, the Luxemburg Pat. No. 72,353 and the German Pat. No. 1,648,336. The German Pat. No. 1,648,336 discloses a machine for balancing vehicle wheels in which machine a disc mounted on the shaft of the machine furnishes binary code numbers to a processing circuit. The latter comprises an instantaneous reading device and a store together connected to a comparator. This comparator ascertains whether there is equality or not between the read value and the stored value. If there is equality, the comparator furnishes a signal. Therefore it is impossible in this circuit to obtain the exact value of the difference, whereas this parameter may be of very great interest for ensuring a very convenient utilization of the apparatus, even by unqualified operators.

An object of the present invention is to provide a machine for balancing vehicle wheels comprising a rotary shaft adapted to receive the wheel to be balanced and connected to a motor for driving the wheel up to a predetermined speed, at least one measuring device responsive to imbalance of the wheel and furnishing a measurement signal as a function of the value of the imbalance, and means for determining the angular position of the imbalance after stoppage of the wheel by a new rotation of the wheel, said means for determining the angular position of the imbalance comprising an angular coding device capable of furnishing a series of code numbers each corresponding to a given angular position of the wheel, a reader for reading the code inscribed on the coding device, at least one store connected to the reader, a measuring device for storing, for a predetermined position of the imbalance, the value of the number which is presented in front of the reader at a moment when the imbalance passes through said position, and a storage authorizing circuit for authorizing the storage while said motor rotates at the desired measuring speed, wherein there is also provided a device for calculating the difference ($\gamma$) between the instantaneous number ($\beta$) furnished by the reader and the number ($\alpha$) stored in the store, after stoppage of the wheel, and a circuit for utilizing said difference for indicating, after said new rotation, the position that the imbalance had at the moment of the storage.

Owing to these features, there is therefore obtained, at each instant, the value of the difference between the measured angle and the stored angle. This value can be utilized in particular for:

1. indicating the preferred direction in which the wheel must be rotated for returning it to the desired position through the smallest angle;
2. indicating to the user rotating the wheel that he approaches the desired position of the wheel for correctly determining the imbalance;
3. possibly employing the value for controlling a motor adapted to automatically return the wheel to its sought position.

Further features will be apparent from the ensuing description.

In the drawings, given solely by way of example:

FIG. 1 is a diagrammatic prespective view of the machine according to the invention;

FIG. 2 is a developed view of the code inscribed in the coding device, which is in the present case a disc comprising transparent and opaque compartments forming a natural binary code;

Figure 3A:
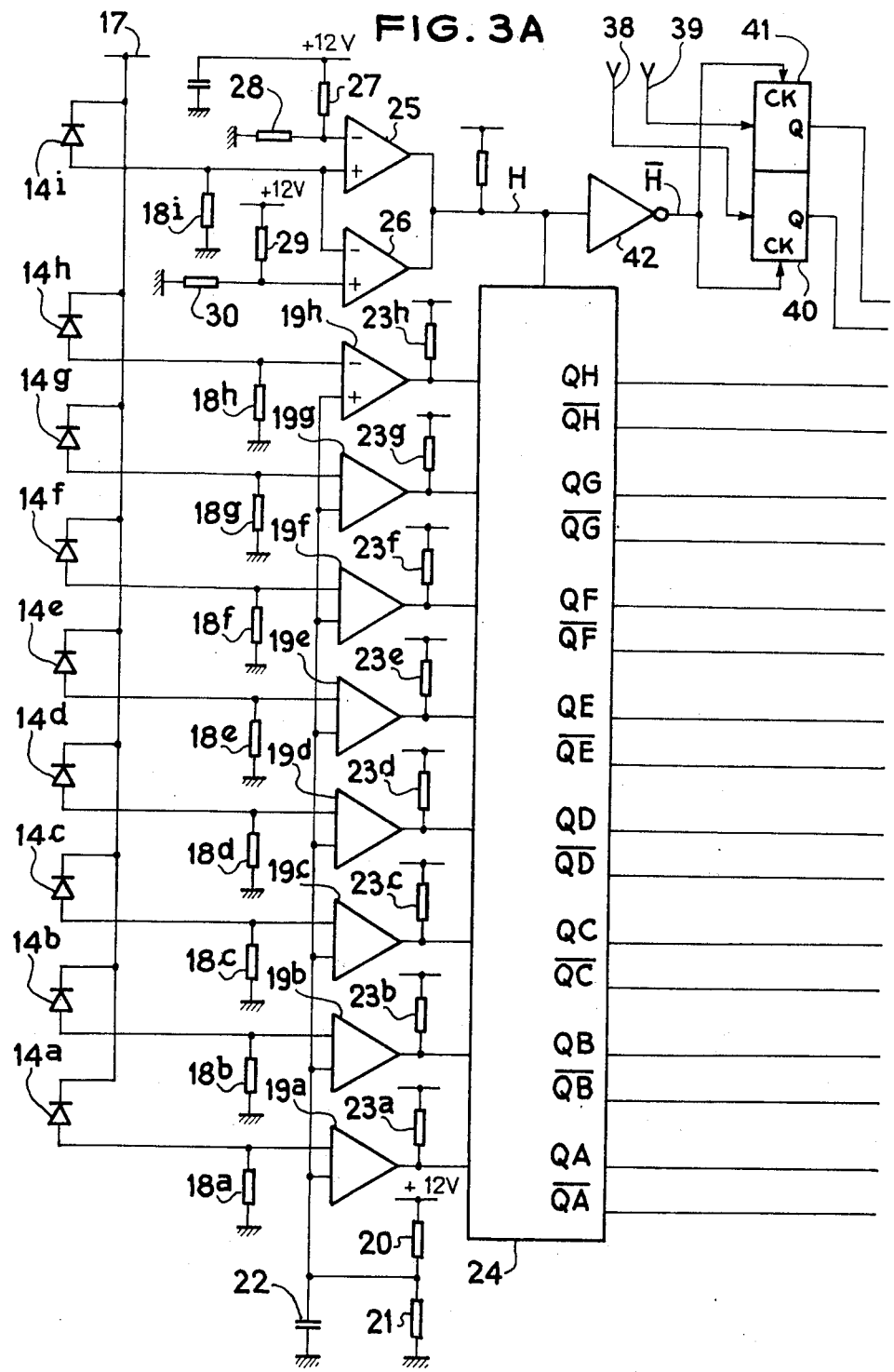
Figure 3C:
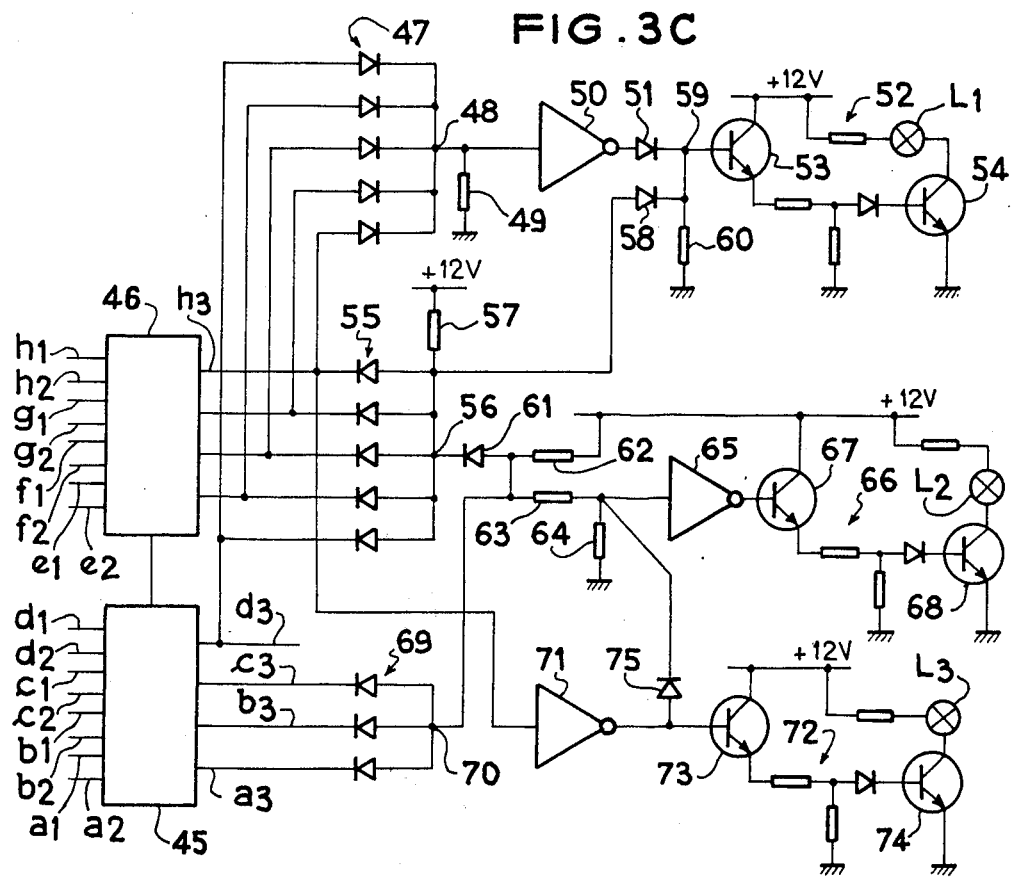
Figure 7:
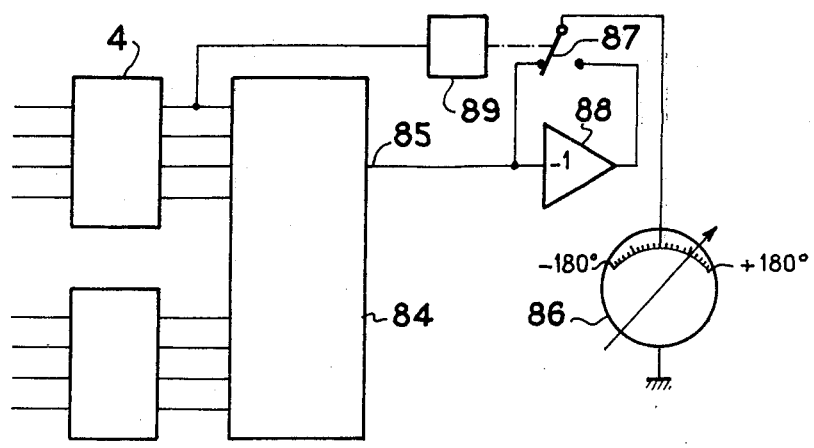
Figure 4:
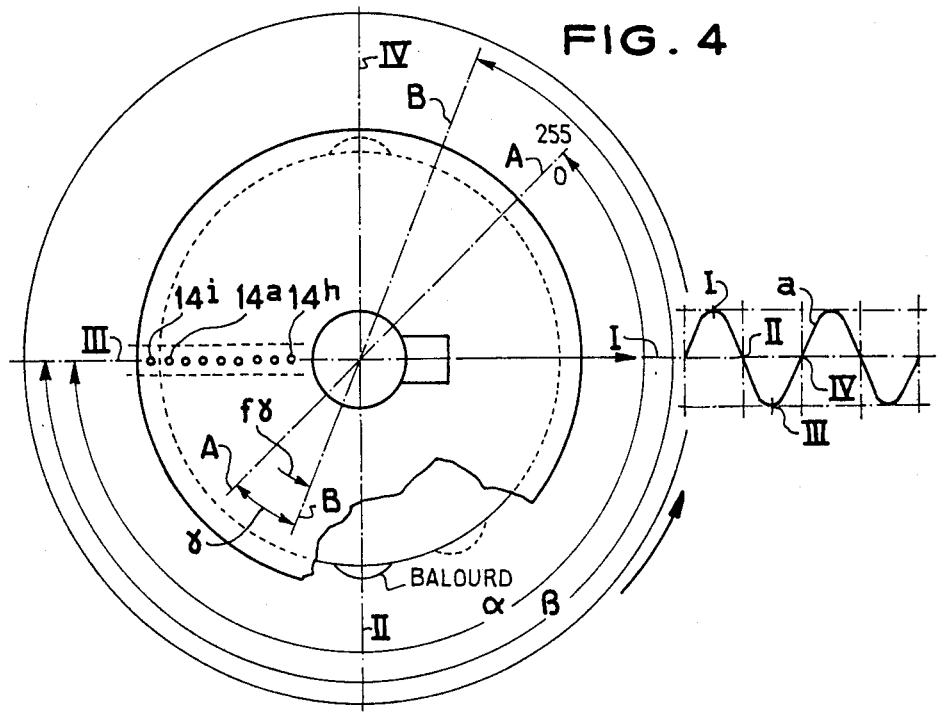
Figure 5:
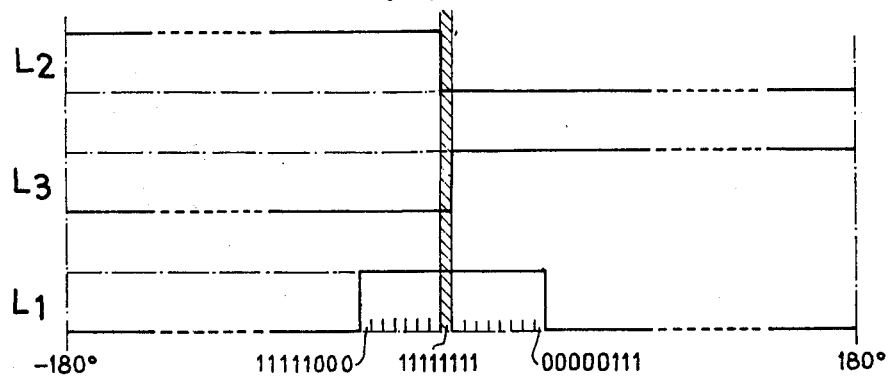
Figure 6:
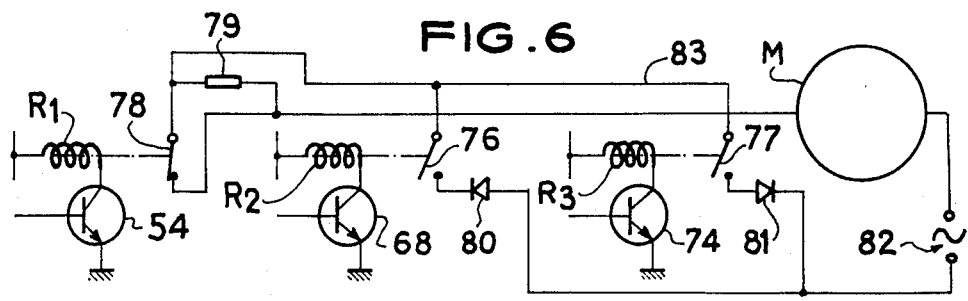

FIGS. 3A, 3B and 3C form, together, a detailed diagram of the machine according to the invention;

FIG. 4 is a diagram illustrating the operation of the balancing machine;

FIG. 5 shows three curves of light signals produced by the utilization circuit for indicating the position of the imbalance;

FIG. 6 shows a modification of the machine according to the invention which permits an entirely automatic operation, and FIG. 7 shows another modification of the invention with an analog display of the result of the measurement.

According to the embodiment shown in FIGS. 1-5, the device according to the invention equips a balancing machine comprising a frame B in which there is rotatably mounted a shaft A carrying at one end a plate P for mounting a wheel R to be balanced. The shaft is connected in a conventional manner to driving means such as an electric motor. These driving means are diagrammatically represented by the rectangle M in FIG. 1. The plate P is preferably removable and of the so-called universal type so as to be capable of receiving vehicle wheels of all types and makes.

The shaft A is mounted in bearings 1 and 2 which are each provided with a pressure detector 3,4. This detector is adapted to furnish an electric signal which is a function of the pressure exerted by the shaft A on a given part of the bore of the bearing during the rotation of the shaft. The pressure of the shaft A on the bearings may be produced by an imbalance of the wheel R which tends to cause the shaft to oscillate in the bearings. These detectors are connected to a computer 3A, 4A furnishing two sinusoidal signals which represent the respective imbalances of the front and rear faces or sides of the wheel. The value of the outer imbalance (front face) is determined directly in the circuit 4A, whereas the value of the inner imbalance is calculated in the circuit 3A from the signals furnished by two detectors 3 and 4, while taking into account a necessary correction for compensating for the geometric position of the detectors and the dimensions of the wheel R.

The computer device 3A, 4A is connected to a circuit 5 for determining the value of the imbalance. This circuit measures the amplitude of the sinusoidal signals furnished by this device, this amplitude being indeed a function of the magnitude of the imbalance of the wheel R.

The device according to the invention comprises a coding disc 6 which is keyed on the shaft A at the rear end of the latter. Its peripheral portion is provided with nine coded tracks 7a to 7h and 8 respectively, each track having opaque and translucent compartments. The tracks 7a to 7h together represent 256 angular positions on the disc which are radially oriented on the latter. Indeed, each position is represented by a pure or natural binary number, an opaque compartment representing for example the bit 1 and a translucent compartment the bit 0. The track 8 is angularly offset by a semiposition or pitch and serves, as explained hereinafter, to furnish a clock signal and to suitably shape the signal produced from the code of the disc.

The code inscribed on the disc 6 is read by an optical reader 9 comprising a tubular lamp 10 having a rectilinear filament placed in front of a row of nine apertures 11 formed in one of the branches of a yoke 12 which is positioned astride the periphery of the disc 6. The apertures 11 are radially aligned with respect to the disc and respectively coincide with the nine tracks of the latter.

The other branch of the yoke 12 also has a row of nine apertures 13 which are in alignment with the apertures 11 and each aperture is placed in front of a photodetecting element 14a to 14i respectively, these photodetectors being all connected through a line 15 to an electronic utilization circuit 16. Owing to the length of the apertures of the yoke 12, there is obtained a precise reading of the code on the disc and the arrangement avoids interactions between the various tracks and between the different zones of each track.

The photosensitive elements 14a to 14i (FIG. 3A) are preferably n-p-n type silicon phototransistors connected as a diode, their bases being non-connected in the circuit (in FIG. 3A diodes have been shown). The collectors of the phototransistors 14a to 14i are all connected to a supply terminal 17 and their emitters are loaded by resistors 18a to 18i connected to earth.

The junctions between the phototransistors 14a to 14i and their associated emitter resistors 18a to 18h are connected to the positive inputs of a series of comparators 19a to 19h the other inputs of which are connected to a reference voltage produced by a voltage divider comprising resistors 20 and 21 and a decoupling capacitor 22.

The outputs of the eight comparators 19a to 19h are connected, on one hand, to polarization resistors 23a to 23h and, on the other hand, to eight inputs of a buffer store or memory 24.

The junction between the phototransistor 14i and the resistor 18i is connected to the positive input of a first comparator 25 and to the negative input of a second comparator 26. The negative input of the first comparator 25 is connected to the junction between two resistors 27 and 28 which are connected in series between the supply voltage and earth. The positive input of the other comparator is also connected to the junction between two other resistors 29 and 30 which form a voltage divider and are connected between the supply voltage and earth. The ratios of the voltage dividers are $\frac{1}{3}$ and $\frac{2}{3}$ (10kΩ, 12kΩ and 10kΩ, 8kΩ for example) so that the negative input of the comparator 25 receives $\frac{2}{3}$ of the supply voltage, whereas the positive input of the comparator 26 receives $\frac{1}{3}$ of this voltage. The outputs of the comparators are connected together so that these comparators form an OR gate at the output of which a clock signal appears whose frequency is determined by the speed of passage of the track 8 in front of the photodetector 14i.

As the signal issuing from the photodetector 14i has appreciable rise and fall times, the times during which this signal is situated between $\frac{1}{3}$ and $\frac{2}{3}$ of the supply voltage is detected by the comparators 25 and 26 and the clock signal therefore corresponds to this detected signal, which occurs at moments when the transitions between translucent and opaque zones of the track 8 of the disc pass in front of the reader 12. It also corresponds to the moment when the items of information of the other tracks are centered on the apertures of the reader so that these items of information may be used with no risk of error.

Thus, at the outputs of the store 24 a coded eight-bit angular information is obtained which is variable by the rotation of the disc 6 integral with the wheel to be balanced, and this change in the information occurs in synchronism with the clock signal produced by the track 8. The store 24 has two groups of outputs QA to QH and $\overline{QA}$ to $\overline{QH}$ and therefore furnishes the eight-bit code and the complement of the latter.

The outputs QA to QH of the buffer store 24 are connected in parallel and bit by bit to two stores 31 and 32, or, in other words, each output QA to QH of the store 24 is connected in parallel to the corresponding inputs of the stores 31 and 32.

The stores 31 and 32 are employed, in turn, for respectively determining the imbalances on the two sides or faces of the wheel R to be balanced. For this purpose, each store comprises an inhibiting input 33 which may be excited from the positive supply terminal and through a store-selecting switch 34. This switch 34 is connected to a resistor 35 and also, on one hand, directly to the input 33 of the store 32 and, on the other hand, through an inverter 36, to the input 33 of the store 31. Thus, the position of the switch 34 determines which of the two stores is employed for the measuring procedure.

Each store also has an authorizing input 37 which is excited as long as the driving motor M of the balancing device is carrying current. It is during this period that the stores are therefore authorized to be filled. For this purpose, the input 37 is connected through a line 37A to control means (not shown) of the motor M.

The angular items of information are stored in the stores 31 and 32 for each rotation of the shaft A when the imbalance in question passes to a given position, the lowermost position for example, as long as the motor M is supplied with current. As shown in FIG. 4, this instant may be easily determined from the signal furnished by the computer device 3A, 4A which furnishes the sinusoidal signals a. As in the illustrated embodiment the detectors are placed at an angular distance of 90° from the lowermost position of the imbalance, the instant when this imbalance passes through this position is determined by the passage through zero (point II in FIG. 4) of the signal of the computer device, namely that which immediately follows the positive maximum point of the curve of the signal (point I in FIG. 4). This passage through zero is detected by an appropriate conventional circuit and converted into a signal for initiating the storage. Thus such a signal corresponding respectively to the two imbalances is applied to the terminals 38 and 39 (FIG. 3A). These terminals are respectively connected to the inputs "D" of two D-type flip-flop circuits 40 and 41 which receive at their clock inputs Ck the inverse $\overline{H}$ of the clock signal through an inverter 42 whose input is connected to the comparators 25 and 26. The outputs Q of the flip-flops 40 and 41 are respectively connected to the clock inputs 43 and 44 of the stores 31 and 32.

The illustrated circuit comprises two adders 45 and 46 having four bits and mounted in a cascade manner. The adders comprise two series of inputs a-1, a-2, b-1, b-2, c-1, c-2, etc. and a series of outputs a-3, b-3, c-3, etc. The inputs of the group a-2, b-2, c-2 etc. are connected to the inverted outputs of the buffer store 24 and the inputs of the other group a-1, b-1, c-1 etc. are connected in parallel to the non-inverted outputs of the stores 31 and 32. Thus the adders 45 and 46 effect an addition of the binary number recorded in either store 31 or 32 which is selected by the switch 34, with the complement of the binary number that the buffer store 24 contains at each instant.

In the presently-described embodiment of the invention, it is arranged that the region where the operator must place the balancing weight or mass on the wheel after the measurement, is located at the highest point of the rim, which signifies that the imbalance of the wheel must then be located at the lowermost point, that is to say vertically below this highest point.

After the measurement, the operator must therefore have an information of the angular position of the wheel which may inform him of the location of the imbalance. For this purpose, the device according to the invention comprises a set of three indicator lamps $L_1$, $L_2$, $L_3$ which are placed in alignment on one side of the plate P. These lamps are lit up after the wheel has been started up and are extinguished after cutting off the motor M. The stopping position of the wheel is of course uncertain and the operator must place the wheel in such angular position that imbalance is located at the bottom.

The circuit which will now be described uses the information contained in either of the stores 31, 32 and the instantaneous information furnished by the buffer store 24 for lighting up the lamps $L_1$, $L_2$, $L_3$ in such manner that the lamp $L_1$ is lit up during an angular interval corresponding to 16 pitches of the code of the disc and is extinguished during the rest of the rotation of the wheel (the latter being driven either by hand or automatically as will be described hereinafter with reference to modifications of the invention).

The lamp $L_2$, which is seen in the form of an arrow, lights up during a semi-rotation of the wheel and indicates the direction in which the latter must be rotated. The lamp $L_3$, which is also seen in the form of an arrow, lights up in the other semi-rotation of the wheel and indicates the opposite direction of rotation.

Note that the lamps $L_2$ and $L_3$ light up respectively for indicating the direction of rotation of the wheel which corresponds to the shortest angular rotation for reaching the searched or required position of the wheel.

Further, in this position, the two lamps $L_2$ and $L_3$ are extinguished whereas the lamp $L_1$ remains lit up, the latter being more particularly intended to indicate the approach of the searched position. As shown in FIG. 2, the code of the disc 6 ranges from 0 to 255 so that on one half of the disc the track corresponding to the most significant bit $7h$ is either completely opaque or completely transparent. This information is used for controlling the illumination of either of the lamps $L_2$ or $L_3$.

The following table gives, for an arbitrarily chosen angular position of the imbalance by way of example as being 1 001 1 001, the binary values of the 16 positions which are centered on the searched position and the outputs that they produce at the stores 24, 31 or 32 and at the adders 45 and 46.

|  | Output of store 31 or 32 | | Complementary output of the buffer store 24 | | Adder outputs | |
|---|---|---|---|---|---|---|
| 8 | 1001 | 1001 | 0110 | 1110 | 0000 | 0111 |
| 7 | 1001 | 1001 | 0110 | 1101 | 0000 | 0110 |
| 6 | 1001 | 1001 | 0110 | 1100 | 0000 | 0101 |
| 5 | 1001 | 1001 | 0110 | 1011 | 0000 | 0100 |
| 4 | 1001 | 1001 | 0110 | 1010 | 0000 | 0011 |
| 3 | 1001 | 1001 | 0110 | 1001 | 0000 | 0010 |
| 2 | 1001 | 1001 | 0110 | 1000 | 0000 | 0001 |
| 1 | 1001 | 1001 | 0110 | 0111 | 0000 | 0000 |
| point of coincidence | 1001 | 1001 | 0110 | 0110 | 1111 | 1111 |
| 1 | 1001 | 1001 | 0110 | 0101 | 1111 | 1110 |
| 2 | 1001 | 1001 | 0110 | 0100 | 1111 | 1101 |
| 3 | 1001 | 1001 | 0110 | 0011 | 1111 | 1100 |
| 4 | 1001 | 1001 | 0110 | 0010 | 1111 | 1011 |
| 5 | 1001 | 1001 | 0110 | 0001 | 1111 | 1010 |
| 6 | 1001 | 1001 | 0110 | 0000 | 1111 | 1001 |
| 7 | 1001 | 1001 | 0101 | 1111 | 1111 | 1000 |
| 8 | 1001 | 1001 | 0101 | 1110 | 1111 | 0111. |

With reference to FIG. 3C, it can be seen that the outputs a-3 to h-3 of the adders 45 and 46 are connected to a circuit controlling the lamps $L_1$ to $L_3$.

The outputs d-3 to h-3 are connected to an AND gate 47 having five diodes the common output 48 of which is connected to earth through a resistor 49 and to the input of an inverter 50. The output of the latter is connected to the anode of a diode 51. The cathode of this diode is connected to an amplifier 52 having two cascade-connected transistors 53 and 54, the lamp $L_1$ being mounted in the collector connection of the transistor 54. The lamp lights up when the voltage at the base of the transistor 53 has the logic value "".

The ouputs d-3 to h-3 are also connected to another AND gate 55 having five diodes whose common output 56 is connected to the positive supply voltage through a resistor 57 and to the anode of a diode 58 whose cathode is connected to the junction 59 between the base of the transistor 53 and the diode 51. This junction point is connected to earth through a resistor 60.

The output 56 of the AND gate is connected to the cathode of a diode 61 whose anode is connected to the positive supply voltage through a resistor 62. This anode is also connected to two resistors 63 and 64 which are connected in series and also connected to earth, the junction of the resistors 63 and 64 being connected to the input of an inverter 65 whose output is connected to an amplifier 66 constituted by two cascade-connected transistors 67 and 68 supplying current to the lamp $L_2$. This amplifier 66 controls the illumination of the lamp $L_2$ for a logic signal "1" at the output of the inverter 65.

It will be observed that the AND gate 47, owing to the connection of its diodes, opens when five signals of logic level "0" are present at its inputs, whereas the AND gate 55 opens on the contrary in the presence of five signals of logic level "1" at its inputs.

The outputs, b-3 and c-3 of the adder 45 are connected to an AND gate 69 having three diodes which opens in the presence of three logic signals "1" at its inputs. The output 70 of this gate is connected to the junction between the resistors 62 and 63.

The output h-3 of the adder 46, which constitutes the most significant bit of the overall signal furnished by the two adders 45 and 46, is connected to an inverter 71 whose output is connected to an amplifier 72 constituted by two transistors 73 and 74 connected in cascade and controlling the lamp $L_3$. The latter is lit up when a signal of logic level "1" is present at the base of the transistor 73. The latter is furthermore connected through a diode 75 to the input of the inverter 65.

This circuit operates in the following manner:

The wheel is made to rotate by the motor M. For each rotation of the wheel R and as soon as the signal furnished by the computer device 3A, 4A passes through a zero as described hereinbefore, which corresponds to the appearance of signals at the outputs 38 and 39, the instantaneous value furnished by the code of the disc 6 is stored in the corresponding store or memory 32 or 32. In the chosen example, this value is for one of the stores 1 001 1001. At this instant, the imbalance of the wheel (either side thereof) is at the lowermost point as shown in full line in FIG. 4 and the number stored corresponds to the angle $\alpha$ measured between the line A—A and the location of the photodetectors 14a to 14i, the line A—A coinciding with the transition between the code values 0 and 255.

When the speed of the wheel 5 has become stable, the motor M is stopped and the signal authorizing the storage is suppressed and is no longer applied to the stores 31, 32 so that the latter retain the value they had recorded at the moment of cutting off.

As the motor M is no longer energized, the wheel slows down and finally stops in any angular position unknown to the operator. This position corresponds for example to that in which the line A—A is shifted toward the position B—B and the buffer store 24 then contains the number corresponding to the angle $\beta$. After selection of the inner or outer imbalance which it is desired to compensate for in the first place by means of the switch 34, the operator then turns the wheel until the lamps $L_1$-$L_3$ indicate that the position of storage which was fugitive but whose angular coordinate was retained in the selected store 31 or 32 is reached. The angular rotation will then be the angle $\gamma$ and the wheel is turned in the direction of the arrow $f\gamma$ indicated in FIG. 4.

At the moment when the lowermost position of the imbalance is reached, the contents of the stores 24 and 31 or 32 are complementary and there appears at the outputs of the adders 45 and 46 the number 1111 1111 as indicated in the above table.

If the wheel stops in position in which the outputs of the store 24 (disc 6) and of the store 31 or 32 (number stored) produce at the outputs of the adders 45 and 46 a number which comprises in respect of the most significant bit a logic "0", the outputs h-3 of the adder 25 is a "0", so that at the output of the inverter 71 there appears a "1" which effects the illumination of the lamp $L_3$. The logic signal "1" is transmitted through the diode 75 to the input of the inverter 65 which thus furnishes an "0" to the amplifier 66 and the lamp $L_2$ is then extinguished.

The situation does not change during the rotation of the wheel as long as the most significant bits of the number furnished by the adders 45 and 46 are not all equal to 0. But as soon as the wheel is turned in such manner that it is only eight positions from the searched position, five "0" are presented at the AND gate 47. At this instant the inverter 60 receives a "0" at its input and effects by its output the illumination of the lamp $L_1$. The lamp $L_2$ remains illuminated.

In continuing to rotate the wheel, the number at the outputs of the adders reaches 0000 0000, then passes to 1111 1111, which number corresponds to the searched position (1001 1001 on the disc in this chosen example). At this instant, the output h-3 changes state, applying a "1" to the input of the inverter 71 which thus transmits a "0" to the amplifier 72. The lamp $L_3$ is extinguished. Moreover, as the outputs a-3 to h-3 are all at the logic level "1", the inverter 65 receives a "1" at its input, which applies a "0" to the amplifier 66. The lamp $L_2$ remains extinguished. On the other hand, the lamp $L_1$ remains illuminated since now it is the AND gate 55 which transmits the logic level "1" of its output to the amplifier 56 through the diode 58.

Consequently, the searched position is signalled by the simultaneous extinction of the lamps $L_2$ and $L_3$ and by the fact that the lamp $L_1$ is maintained illuminated.

In passing beyond the searched position during seven pitches of the disc 6, a "0" is present at at least one of the outputs a-3 to c-3, which applies a "0" to the input of the inverter 65, the lamp $L_3$ being then illuminated during these seven pitches. Moreover, during this interval the lamp $L_1$ remains illuminated owing to the application of five "1" to the input of the AND gate 55.

However, when the eighth pitch of the disc 6 beyond the searched position is reached, the lamp $L_1$ is extinguished since neither the AND gate 47 nor the AND gate 55 remains open. On the other hand, the lamp $L_3$ remains illuminated since at least one of the inputs of the AND gate 55 is "0" so that there is a "1" at the output of the inverter 65.

Note that the lamps $L_2$ and $L_3$ are seen by the operator in the form of arrows which, as they are disposed next to the wheel R, indicate in which direction it should be rotated for reaching the searched position through the shortest angle of rotation. This is due to the fact that the illumination of the lamps $L_2$ and $L_3$ is controlled by the valve of the most significant bit.

If, in stopping, the wheel is located in a position corresponding to the half of the disc 6 in which the track 7h indicates a "1", the procedure described hereinbefore occurs of course in the opposite direction.

Note also that with an inverse logic, it is possible to arrange that the searched position corresponds to the number 0000 0000 instead of the number 1111 1111.

Thereafter, having determined the position of one of the imbalances, the operator can actuate the switch 34 for determining the position of the other imbalance by means of the contents of the store 31 or 32 which has not yet been employed.

According to FIG. 6, which is a simplified diagram of a modification, the lamps $L_1$ to $L_3$ may be replaced by relay coils $R_1$ to $R_3$ respectively for controlling the motor M of the balancing device, or an auxiliary motor, so that the operator has no need to rotate the wheel R himself for finding the lowermost position of the imbalance.

The relays $R_2$ and $R_3$ respectively control two normally-open contacts 76 and 77 whereas the relay $R_1$ controls a normally-closed contact 78 shunted by a resistor 79. The contact 76 and 77 are respectively connected to diodes 80 and 81 which are mounted in opposed relation to each other. Consequently, the cathode of the diode 80 and the anode of the diode 81 are both connected to a terminal of a supply source 82 supplying current to the motor M through one of its terminals. The other terminal of the motor M is connected to the contact 78. The contacts 76 to 78 are connected to each other by a conductor 83.

The sequence of operation which permits energizing the relays $R_1$ to $R_3$ is as shown in FIG. 5. In other words, when the wheel stops, either relay $R_2$ or relay $R_3$ is energized. By closing its contact, this relay supplies current to the motor M through the associate diode 80 or 81 and in the direction which corresponds to the shortest angular path. As soon as the wheel is located within eight (or seven) pitches from the searched position, the relay $R_1$ is energized so that the resistor 79 is put into circuit to reduce the current in the motor M and therefore the speed of rotation. At the moment when the searched position is reached, the relay $R_2$ or $R_3$ is de-energized and the circuit of the motor is cut off.

The circuit shown in FIG. 7 represents the case of an analog representation of the good positioning of the wheel R. The adders 45 and 46 are then connected to a digital-analog converter 84 whose output 85 is applied to a galvanometer 86 through a switch 87. The latter is capable of connecting between the output 85 and the galvanometer 86 an inverter amplifier 88 controlled by an actuating device 89 reacting to the most significant bit of the number issuing from the adders 45 and 46 to indicate the required direction of rotation. The scale of the galvanometer 86 has a graduation ranging from −180° to +180°. This scale may be, if desired, spread out in the middle where a line indicates the searched position of the wheel.

In a modification of the invention, the positions of tthe two imbalances may be displayed simultaneously by employing the stores 31 and 32 at the same time. In this case, either an electronic switch may be provided between the adders 45 and 46 and the stores, for operating in sheared time, or the circuit connected to the outputs of the adders may be doubled.

Having now described my invention what I claim as new and desire to secure by Letters Patent is :

1. A machine for balancing vehicle wheels comprising a rotary shaft defining an axis of rotation and adapted to receive the wheel to be balanced, a motor connected to the shaft to drive the shaft and wheel to a predetermined speed, at least one measuring device responsive to imbalance of the wheel and furnishing a measurement signal as a function of the value of the imbalance, and means for determining the angular position of the imbalance, after stoppage of the wheel, by a new rotation of the wheel, said means for determining the angular position of the imbalance comprising an angular coding device comprising a rotary member coupled to said shaft for rotation therewith, said rotary member having inscribed thereon a series of code numbes, each of which is inscribed respectively in a given radial position with respect to said axis of rotation so as to be representative of a corresponding angular position of the wheel, a stationary reader associated with said rotary member and so arranged as to be capable of reading successively each of said individual code numbers inscribed on said rotary member upon rotation of said wheel, at least one store connected to the reader, a measuring device for storing, in said store for a predetermined position of the imbalance, the value of the individual number which is presented in front of the reader at the moment when the imbalance passes through said predetermined position, and a storage authorizing circuit for authorizing said storage while said motor rotates at the desired measuring speed, there being also provided a calculating device for calculating the difference ($\gamma$) between the valve ($\beta$) furnished by the reader and corresponding to the instantaneous individual number read thereby, and the value ($\alpha$) stored in the store, after stoppage of the wheel, and a circuit for utilizing said difference for indicating, after said new rotation, the position that the imbalance had at the moment of the storage.

2. A machine as claimed in claim 1, wherein said rotary member is a coding disc having a peripheral portion on which peripheral portion said code numbers are inscribed respectively in radial zones of said disc, said code numbers being formed by a natural binary code.

3. A machine as claimed in claim 2, wherein said peripheral portion has a peripheral clock track offset half a pitch from the binary numbers inscribed radially on the disc.

4. A machine as claimed in claim 1, comprising a buffer store connected between said reader and said store.

5. A machine as claimed in claim 1, comprising means for establishing said difference by means of the value of said code number stored in said store and the complement of the value of the instantaneous code number furnished by said reader.

6. A machine as claimed in claim 5, wherein said calculating device comprises two adders having a first group of inputs and a second group of inputs, the reader being connected to the adders through the first group of inputs and the store being connected to the adders through the second group of inputs.

7. A machine as claimed in claim 6, wherein said first group of inputs of the adders are connected to receive the inverse of the value of said code number furnished by said reader and said second group of inputs is connected directly to outputs of said store.

8. A machine as claimed in claim 6, comprising a digital-analog converter to which converter said output of said two adders is connected, and a galvanometer, the digital-analog converter having an output connected to the galvanometer for the analog representation of the predetermined position of the imbalance at the end of the new rotation.

9. A machine as claimed in claim 1, wherein said utilization circuit comprises logic processing means for processing said difference in such manner as to establish three control signals, the first of which signals being produced when said difference reaches a value within two pre-determined limits in the course of the new rotation of the wheels for indicating that the imbalance approaches said pre-determined position, the second and third signals being provided for indicating respectively the direction in which said wheel must be rotated in the course of its new rotation so that the imbalance one more reaches said pre-determined position through the smallest angle of rotation.

10. A machine as claimed in claim 9, wherein said logic processing means comprise three indicator lamps connected in such manner as to light up upon the respective appearance of said signals, the lamps controlled by said second and third signals being in the form of arrows placed on one side of the wheel so as to indicate the desired direction of said new rotation of the wheel.

11. A machine as claimed in claim 10, wherein said logic processing means comprise three relays connected in such manner as to be energized by said three signals, said relays controlling contacts inserted in a supply circuit of an auxiliary motor to ensure the automatic return of the wheel to the position it occupied upon said storage, in the course of said new rotation.

12. A machine as claimed in claim 10, wherein said code numbers are formed by a natural binary code and said logic processing means comprise a first AND gate for detecting one of the logic states of a group of the most significant bits of said difference, a second AND gate for detecting the other logic state of said bits, and a third logic gate for detecting one of the logic states of a group of least significant bits of said difference, the machine further comprising means for establishing said difference by means of the value of said code number stored in said store and the complement of the value of the instantaneous code number furnished by said reader, said rotary member being a coding disc having a peripheral portion on which peripheral portion said code numbers are inscribed respectively in radial zones of said disc, said calculating device comprising two adders having a first group of inputs and a second group of inputs, the reader being connected to the adders through the first group of inputs and the store being connected to the adders through the second group of inputs, said first group of inputs of the adder being connected to receive the inverse of the value of the code number furnished by said reader and said second group of inputs being connected directly to outputs of said store.

13. A machine as claimed in claim 9, wherein said logic processing means comprise three relays connected in such manner as to be energized by said three signals, said relays controlling contacts inserted in a supply circuit of said motor, to ensure the automatic return of the wheel to the position it occupied upon said storage, in the course of said new rotation.

14. A machine as claimed in claim 13, wherein said code numbers are formed by a natural binary code and said logic processing means comprise a first AND gate for detecting one of the logic states of a group of the most significant bits of said difference, a second AND gate for detecting the other logic state of said bits, and a third logic gate for detecting one of the logic states of a group of least significant bits of said difference, the machine further comprising means for establishing said difference by means of the value of said code number stored in said store and the complement of the value of the instantaneous code number furnished by said reader, said rotary member being a coding disc having a peripheral portion on which peripheral portion said code numbers are respectively in radial zones of said disc, said calculating device comprising two adders having a first group of inputs and a second group of inputs, the reader being connected to the adders through the first group of inputs and the store being connected to the adders through the second group of inputs, said first group of inputs of the adder being connected to receive the inverse of the value of the code number furnished by said reader and said second group of inputs being connected directly to outputs of said store.

15. A machine as claimed in claim 1, comprising a store for storing value of code numbers corresponding to the respective imbalances of a front face and rear face of said wheel, and a selecting circuit for the successive determination of the predetermined positions of the two imbalances.

* * * * *